United States Patent [19]

Buckley

[11] Patent Number: 4,635,493

[45] Date of Patent: Jan. 13, 1987

[54] RECIPROCATOR FOR DIE-CASTING MACHINE

[75] Inventor: Richard A. Buckley, Worthington, Ohio

[73] Assignee: Rimrock Corporation, Columbus, Ohio

[21] Appl. No.: 718,180

[22] Filed: Apr. 1, 1985

[51] Int. Cl.4 ............................................. F16F 21/44
[52] U.S. Cl. ................................... 74/99 R; 74/103; 414/917
[58] Field of Search .............. 74/99 R, 101, 102, 103, 74/107, 520, 521; 414/917

[56] References Cited

U.S. PATENT DOCUMENTS

| | | | |
|---|---|---|---|
| 2,143,118 | 1/1939 | Todd | 74/103 |
| 3,286,688 | 11/1966 | Blenman | 74/103 |
| 4,297,908 | 11/1981 | Zimmer | 74/103 |
| 4,298,300 | 11/1981 | Francois et al. | 414/917 |
| 4,299,527 | 11/1981 | Pobocik et al. | 414/917 |
| 4,400,984 | 8/1983 | Ronbeck | 74/103 |
| 4,400,985 | 8/1983 | Bond | 74/103 |
| 4,411,587 | 10/1983 | Niki | 74/101 |
| 4,437,635 | 3/1984 | Pham | 74/103 |

FOREIGN PATENT DOCUMENTS

| | | | |
|---|---|---|---|
| 2820848 | 11/1978 | Fed. Rep. of Germany | 414/917 |
| 52-11559 | 1/1977 | Japan | 414/917 |
| 52-20552 | 2/1977 | Japan | 414/917 |
| 1209308 | 10/1970 | United Kingdom | 414/917 |
| 908741 | 2/1982 | U.S.S.R. | 414/917 |

*Primary Examiner*—Lawrence Staab
*Attorney, Agent, or Firm*—Pearne, Gordon, McCoy & Granger

[57] ABSTRACT

Apparatus for moving a reciprocating fluid emission head automatically through successive operating cycles, into and from a space within which predetermined operations are to be performed. The apparatus includes a frame mounted at one side of the operating space, a crankshaft journaled in the frame and rotary drive means for turning the crankshaft. The crankshaft drives a parallelogram-type link arrangement that includes a main link with one end supported for guided movement in the frame, a carrier arm connected to one end of the main link, a control arm parallel to the main link and connected at one end to the carrier arm and at its other end to the crankshaft, and an intermediate link parallel to the carrier arm and connected between the main link and the control arm. The inner end of the main link is guided through a controlled path of travel whereby the spray head mounted at the outer end of the carrier arm is moved between a retracted position and an extended position located within the operating space.

4 Claims, 9 Drawing Figures

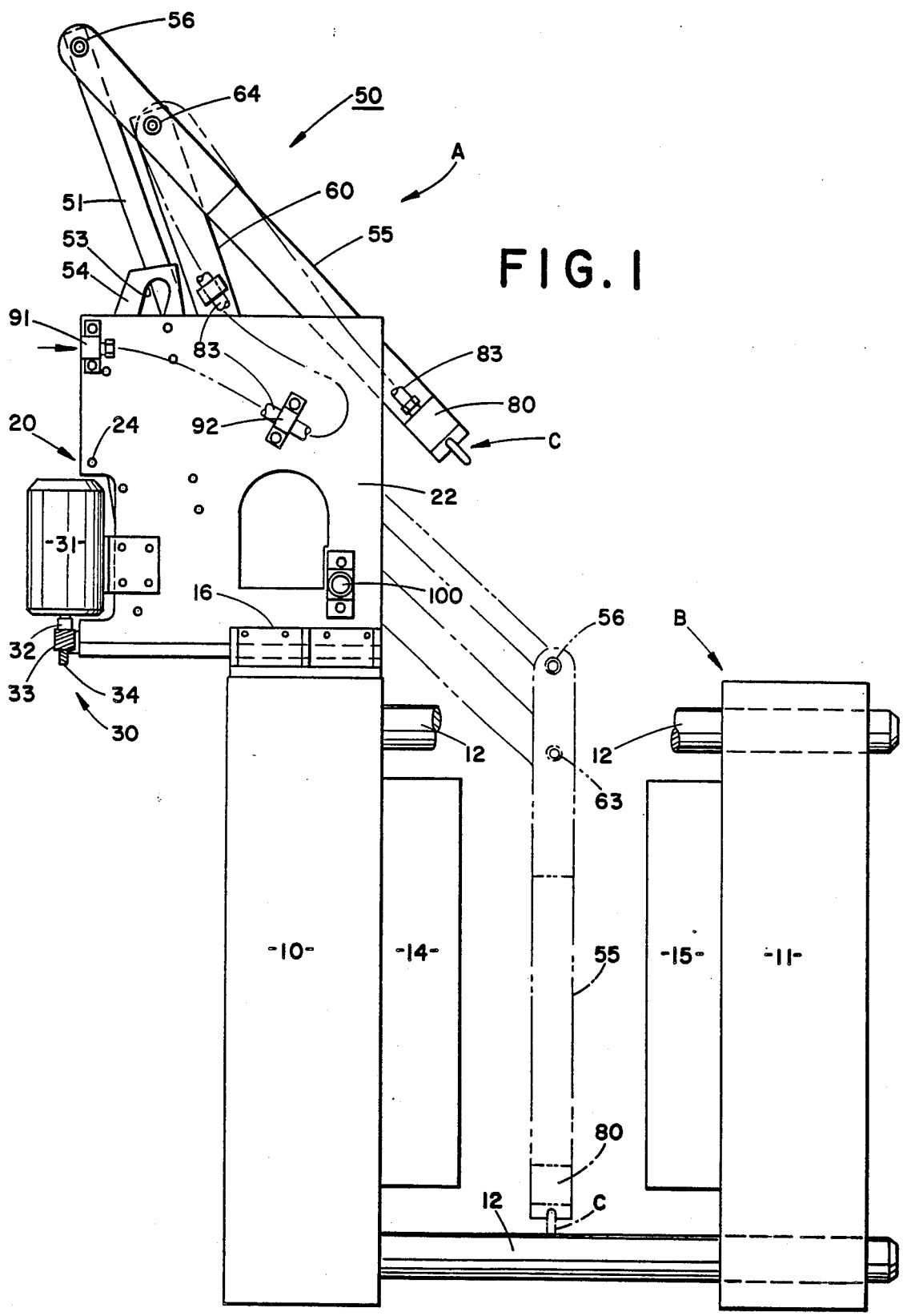

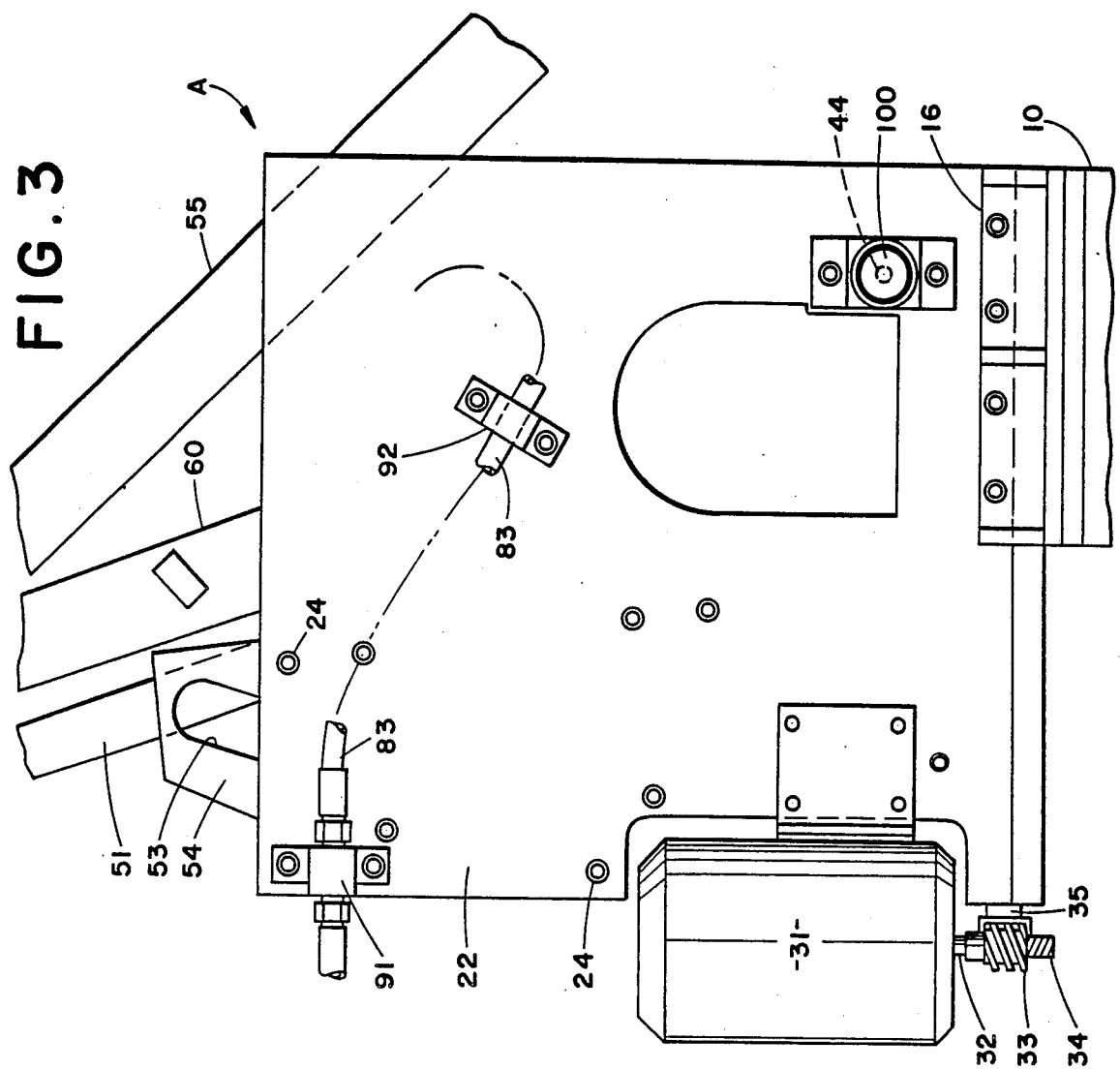
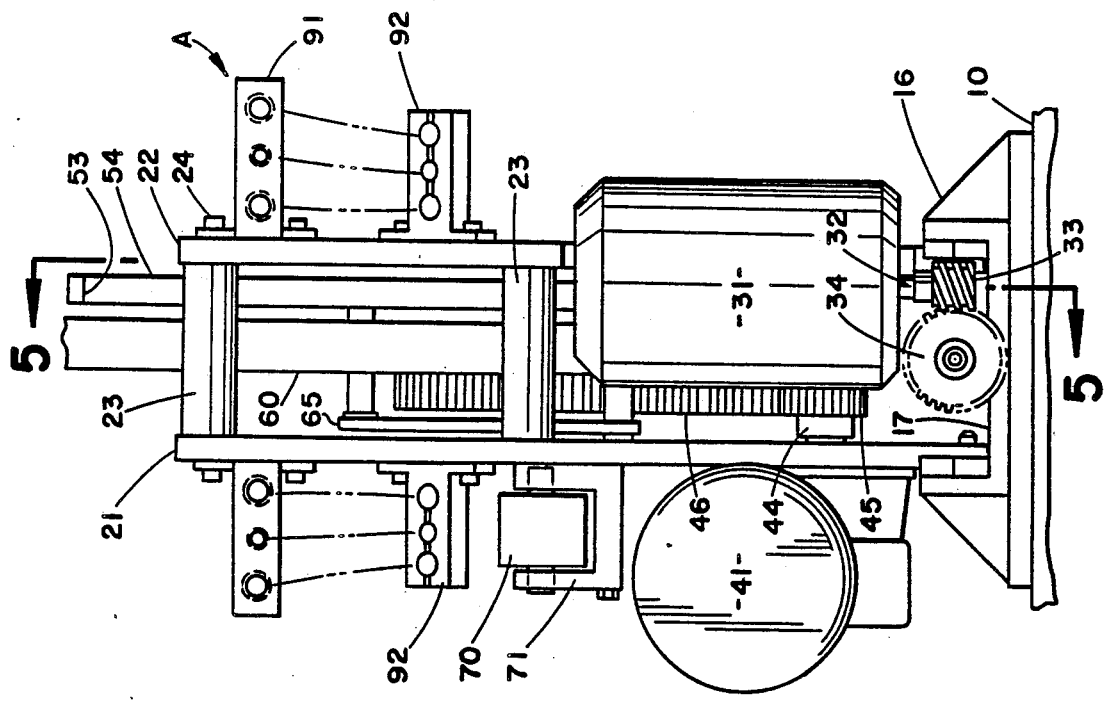

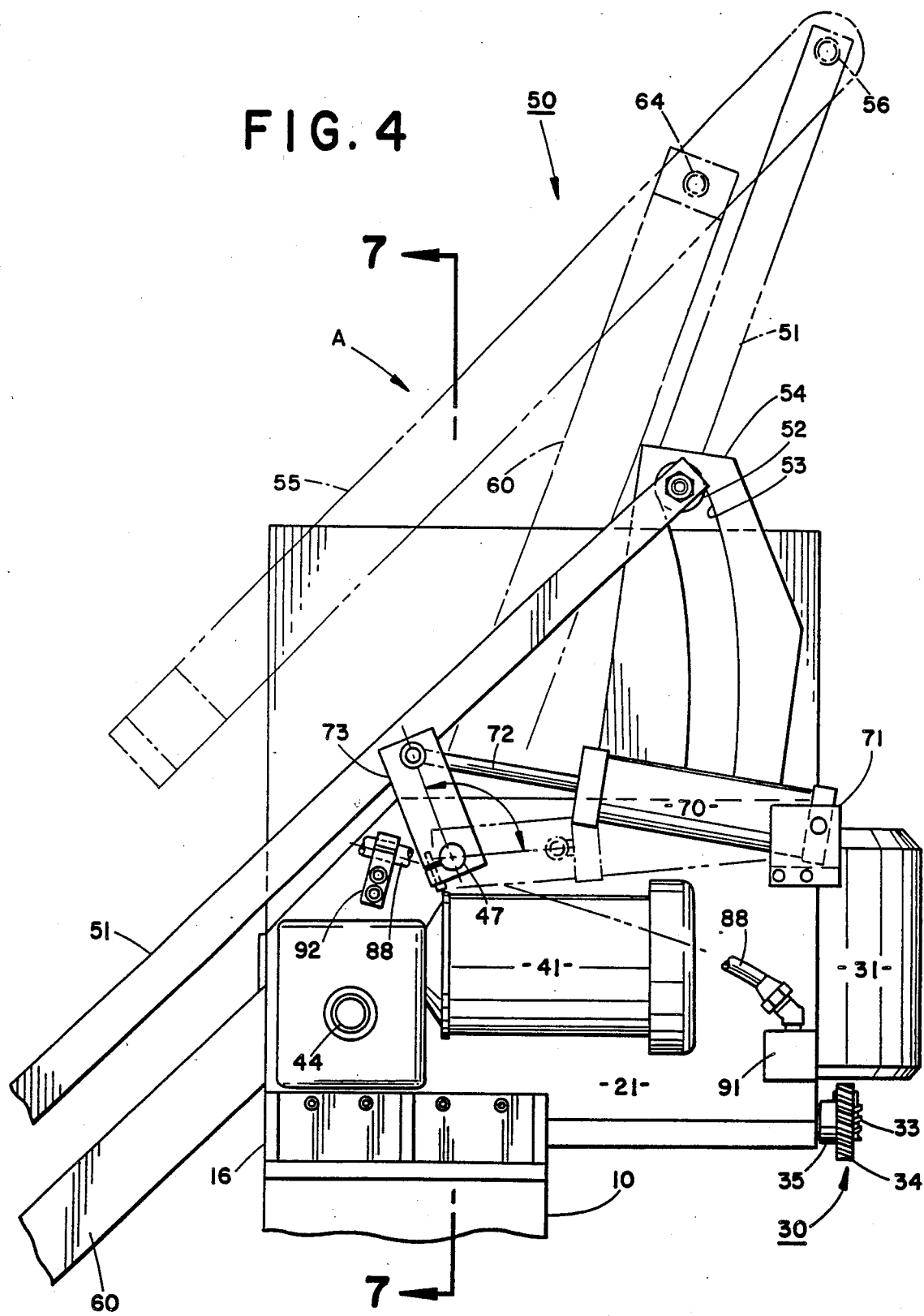

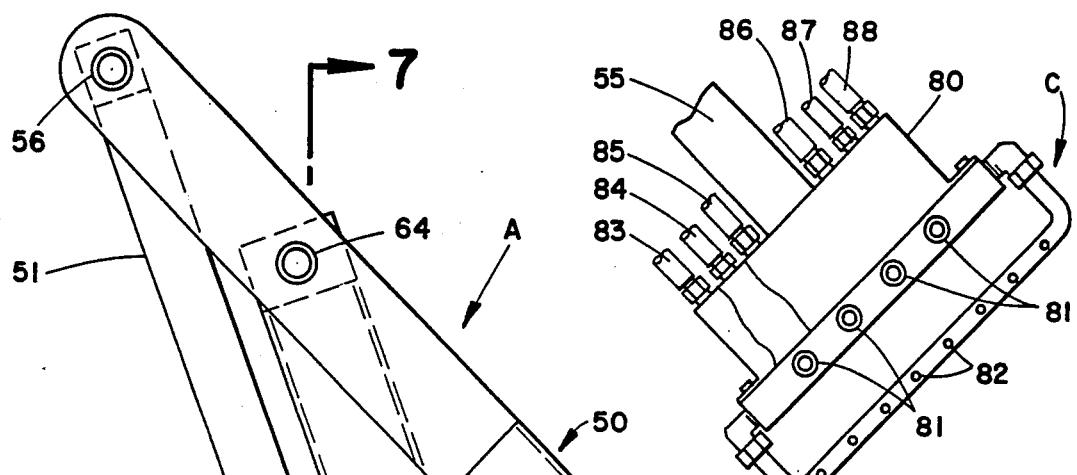
FIG. 5
FIG. 5A
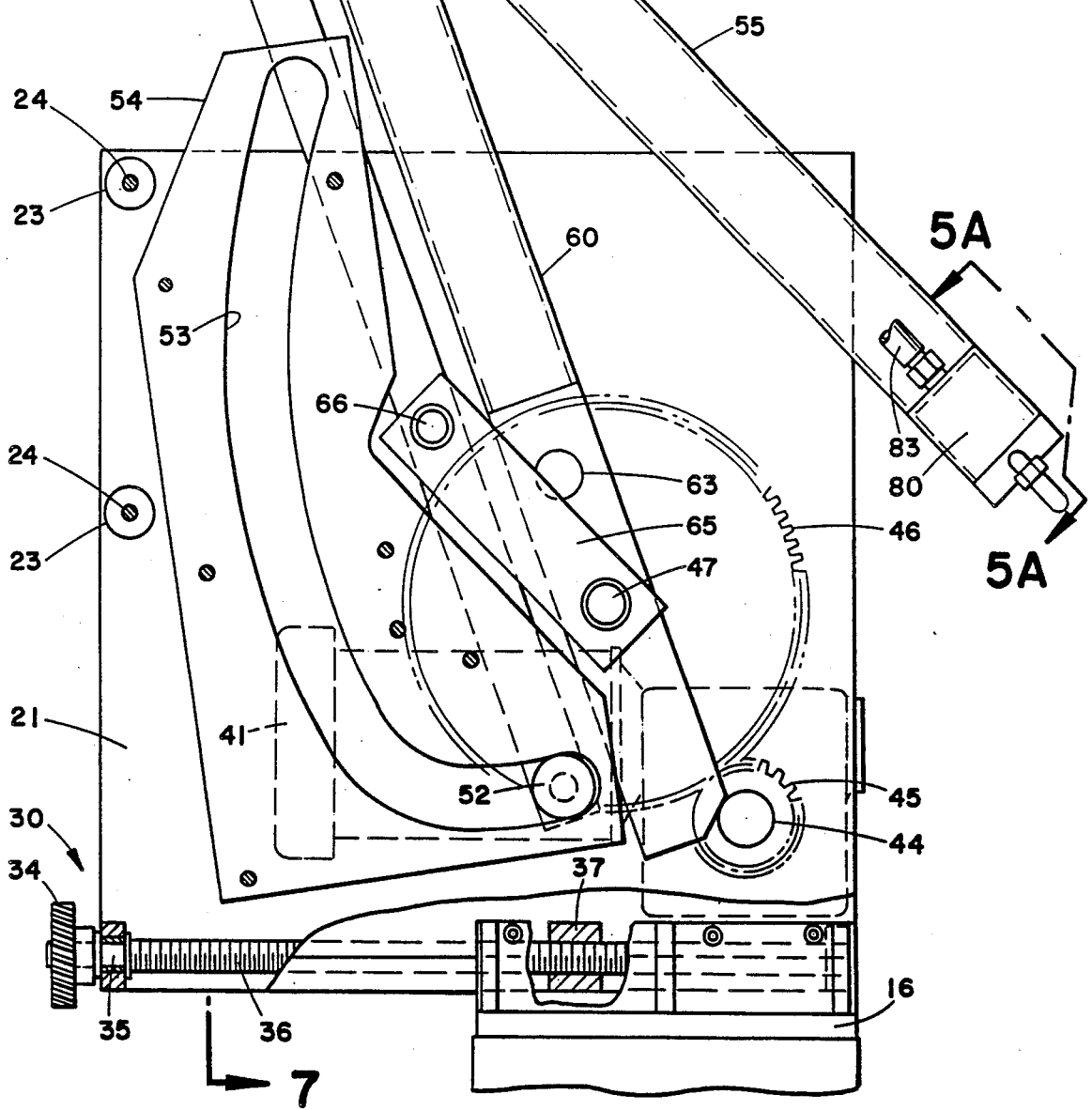

RECIPROCATOR FOR DIE-CASTING MACHINE

BACKGROUND OF THE INVENTION

This invention relates to industrial operating heads adapted to travel through successive operating cycles that generally include extension and retraction to and from a space within which predetermined operations are to be performed.

More particularly, the invention relates to an apparatus for moving the operating head automatically through the desired cycle, and especially where the head travels between the platen of a die-casting machine after each casting operation. In the die-casting application, the operating head may perform certain functions such as spraying a lubricant on the die surfaces and emitting an air blast to remove flash formed at parting lines.

In many industrial forming processes, such as the molding, die-casting, drawing and forging of metals and other materials, it is common practice to apply a lubricant to the working surfaces between each forming cycle. At the same time, while the mold or die sections are separated, other operations are often performed, such as blowing air against the forming surfaces to remove any residual flash that may remain around the die cavities, and also blowing air or spraying air and water to cool surfaces which are difficult to cool with the integral circulating cooling system normally provided. The lubricant, which is generally in liquid or powdered form, improves the flow of the metal or other material being formed, reduces wear of the working parts, and facilitates removal of the newly formed product from the mold or die. Often, two different types of liquid are to be sprayed during an operating cycle.

To apply the lubricant automatically, and thus avoid the necessity of having a worker move between the opposed platens of an open die or mold between cycles, mechanical reciprocating devices are commonly used. These devices move a spray head past the surfaces of the mold or die to be lubricated while the platens are separated, and spray intermittently so as to apply the lubricant to the desired surfaces. Such devices commonly have air blast nozzles as well to help cool various working parts and also to remove flash.

When the forming cycles are repeated quite rapidly, it is necessary to move the spray head and associated equipment at high speed between the open die sections, since the dwell time during which the mold or die platens remain open after removal of the newly formed part is relatively short. The state of the art in this field is shown by the following patents.

| | Patentee | Issued |
|---|---|---|
| U.S. Pat. No. | | |
| 4,293,024 | Kikuchi et al. | Oct. 6, 1981 |
| 4,214,704 | Nagai | July 29, 1980 |
| 4,041,899 | Wolfe and Heath | Aug. 16, 1977 |
| 3,998,388 | Alagna | Dec. 21, 1976 |
| 3,870,164 | Haase | March 11, 1975 |
| 3,699,592 | Miller | June 13, 1972 |
| 3,544,355 | Ott | Dec. 1, 1970 |
| 3,525,382 | Devol | Aug. 25, 1970 |
| 3,522,838 | Ott | Aug. 4, 1970 |
| 3,482,652 | Stone III | Dec. 9, 1969 |
| 3,463,399 | Ott | Aug. 26, 1968 |
| 3,393,658 | Ott | July 23, 1967 |
| 2,929,564 | Stone III | March 22, 1960 |
| 2,695,592 | Szczepanski | Nov. 30, 1954 |

-continued

| | Patentee | Issued |
|---|---|---|
| 2,344,905 | Short | March 21, 1944 |
| German Patent Specification | | |
| 1,296,743 | | Jan. 22, 1970 | and the following publications:
Acheson Technical Brochure, entitled "Dag Swing Arm Reciprocator for automatic spraying of pressure die casting dies";
Rimrock Corp. technical data sheet for Reciprocator Model 001, Model 002, Manifold and Nozzle Assemblies Model 104
Rimrock Corp. technical report No. 3 entitled "How problem tooling runs more profitably at Kolsters Tool and Die"
G-W Plastics Engineers, Inc., technical bulletin 300R Most of the prior art devices in the references listed above utilize fluid drive means, such as hydraulic or pneumatic cylinder and piston assemblies.

A few devices utilize purely mechanical drive means, such as screw and ball type drive as shown in U.S. Pat. No. 4,041,899; however, in each case the device, in order to provide the necessary length of travel of the operating head, is exceptionally long, and since most are mounted over the machine on molding apparatus to be serviced, considerable overhead height is required, at least a height equal to the length of the reciprocating path of travel of the operating head. May installations, however, do not have sufficient height overhead and thus are severely limited as to utilization of the particular space.

In many die casting machines, provision is made for placing a core in the cavity defined by the two die sections. The core is supported at approximately the parting line by a "core-pull" cylinder mounted on the movable die section and extending above the top of the section. After a product is cast in the die cavity with the core in place, the core is lifted out of the casting by the core pull cylinder to permit the casting to be extracted.

Accordingly, reciprocating lubricant spraying devices of prior art design must be supported in a retracted position well above the core pull cylinder when the movable die is in its closed operating position. This is because prior art spraying devices reciprocate in a vertical path and do not permit the spray head to move to a laterally offset position relative to the upward projection of the space between the open die sections.

For the same reason, the length of the stroke of prior art reciprocating devices needs to be extremely long to reach downward to the level of the die cavity.

Another problem that has been encountered with some prior art devices is that spray heads are usually raised directly upward to a position immediately above the die sections and molded products may be spoiled by "after-dribble" of a mold release agent from a spray head of inferior design. The drops from such a spray head damage the appearance and quality of the molded product.

For the reasons described, it is particularly desirable that in the rest position, the spray head be moved to a location that is spaced laterally from the upward projection of the working area.

The device of the present invention reduces the difficulties indicated above, and affords other features and advantages heretofore not obtainable.

SUMMARY OF THE INVENTION

It is among the objects of the invention to minimize the height of an apparatus for automatically moving a fluid emission head through an extension and retraction cycle during which certain predetermined operations are to be performed.

Another object is to provide a reciprocating apparatus of the type described of relatively low-cost construction.

Still another object is to eliminate deficiencies in die-cast products that occur as a result of the lubricant that drips from the spray head.

These and other objects and advantages are satisfied by the unique reciprocator device of the present invention, which is adapted to move a spray nozzle or other fluid emission head through operating cycles that include extension and retraction to and from a space within which the spray head performs certain predetermined operations. The apparatus includes a support assembly mounted on the stationary structure at one side of the operating space, a crankshaft journaled in the support assembly, and a drive means for turning the crankshaft in forward and reverse directions.

The apparatus further includes a parallelogram-type link arrangement that includes a main link having one end extending away from the support assembly and an inner end connected for guided movement to the support assembly. A carrier arm is pivotally connected at one end to the outer end of the main link and is adapted to carry the fluid emission head or spray head at its other end. The parallelogram-type link arrangement also includes a control arm having an inner end rigidly connected to the crankshaft and an outer end pivotally connected intermediate the ends of the carrier arm. The control arm extends parallel to the main link to provide two of the parallel components of the parallelogram link assembly.

The fourth link of the assembly is an intermediate link, with one end pivotally connected to the crankshaft (and thus to the control arm) and its other end pivotally connected intermediate the ends of the main link so as to extend generally parallel to the carrier link. The inner end of the main link is guided through a controlled path of travel by means associated with the frame assembly, whereby the spray head is carried through an operating cycle between a retracted position above and laterally offset from the vertical projection of the operating space and an extended position wherein the spray head is carried to the desired operating position within the operating space.

BRIEF DESCRIPTION OF THE DRAWINGS

FIG. 1 is an elevational view, with parts broken away, illustrating a die-casting apparatus with an associated reciprocator embodying the invention and adapted to carry a spray head between the die platens while they are in an open position (as shown) between operating cycles;

FIG. 2 is a fragmentary end elevation of the reciprocator of FIG. 1;

FIG. 3 is a fragmentary side elevation on an enlarged scale of the reciprocator of FIG. 1, with parts broken away;

FIG. 4 is a fragmentary elevation drawn to the same scale as FIG. 3, showing the opposite side of the reciprocator and illustrating the linkage in an extended position in solid lines and in a retracted position in dashed lines;

FIG. 5 is a fragmentary sectional view, with parts broken away, taken on the line 5—5 of FIG. 2, and illustrating the linkage in the retracted position;

FIG. 5A is a fragmentary, elevational view illustrating the spray head and taken on the line 5A—5A of FIG. 5;

DESCRIPTION OF THE PREFERRED EMBODIMENT

Figure 6:
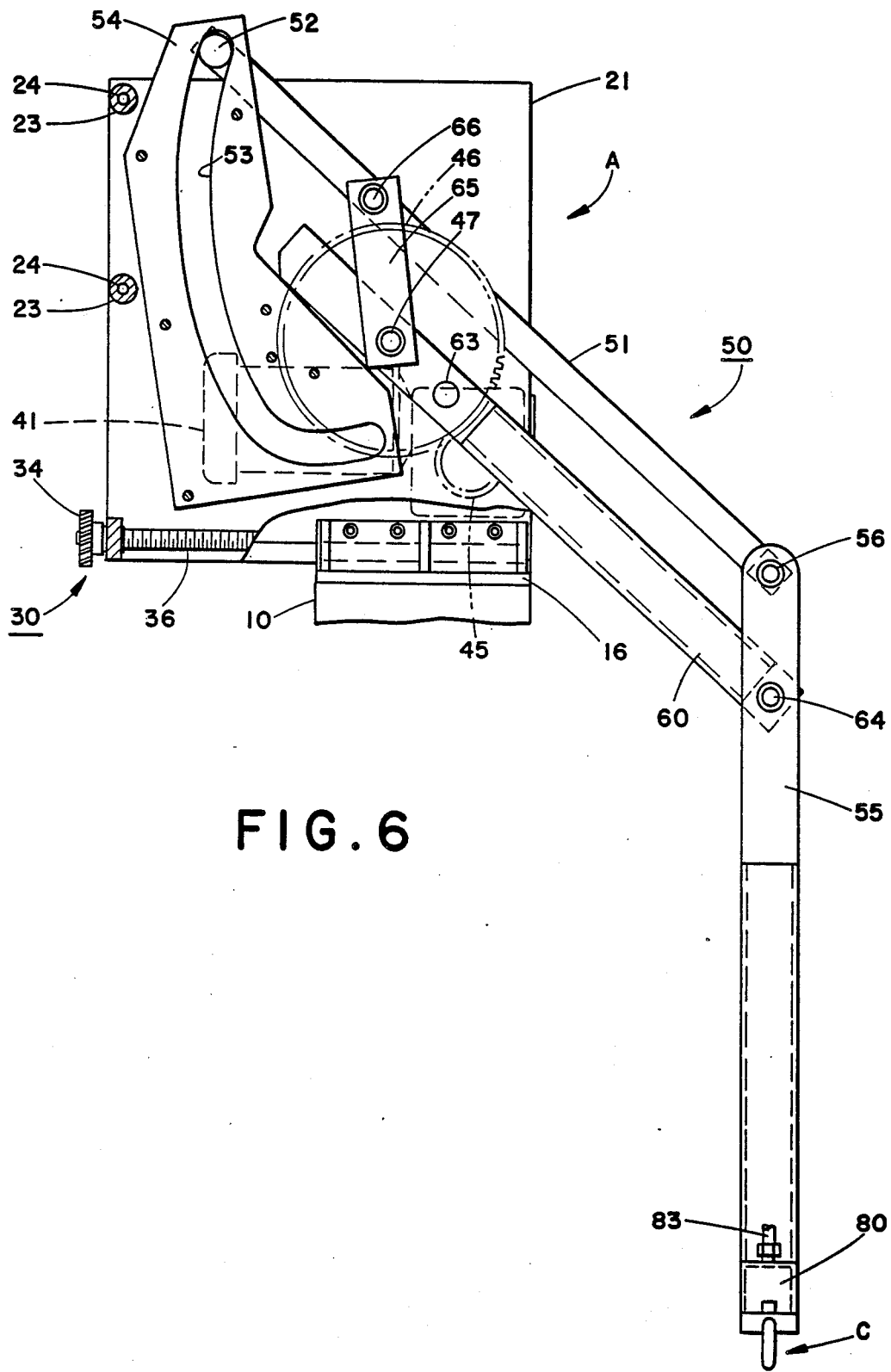
FIG. 6 is a fragmentary, elevational view on a reduced scale of the reciprocator from the same side shown in FIGS. 1 and 3 with parts broken away and showing the linkage positioning the spray head in its fully extended position.
Figure 7:
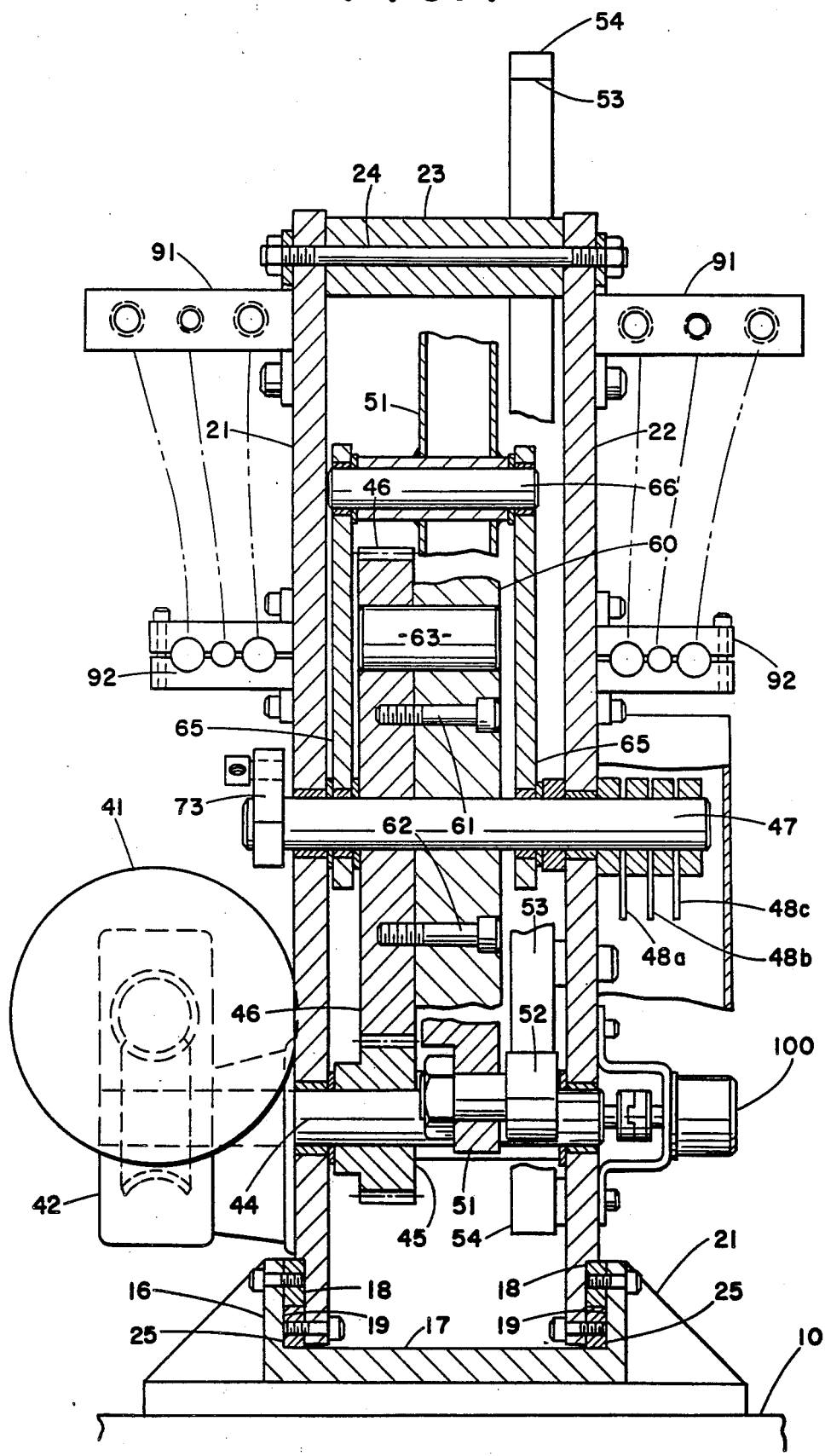
FIG. 7 is a sectional view on an enlarged scale, taken on the line 7—7 of FIG. 5.

Referring more particularly to the drawings, and initially to FIG. 1, there is shown a reciprocating spraying apparatus A embodying the invention and mounted for use in association with a die-casting machine B. The apparatus A is adapted to support and move a reciprocating fluid emission head or spray head C successively through variable speed, variable function operating cycles that include extension and retraction to and from a position between the die sections when in their open position (FIG. 1) between molding cycles, and wherein the spray head C performs predetermined spraying and blowing operations in a programmed, sequential manner. It will be seen from FIG. 1 that the length of travel during extension and retraction of the fluid emission head C is considerable, particularly in view of the limited height of the apparatus A. This long extension in view of the limited height of the apparatus A is a particular advantage achieved with the apparatus of the invention.

The die-casting machine B comprises a stationary platen 10, a movable platen 11, and guide rods 12 which guide the movable platen 11 between its open position shown in FIG. 1 and a closed casting position. Each platen 10 and 11 supports one of two matched dies 14 and 15. The movable platen 11 is moved back and forth between its open and closed position by an operating mechanism (not shown) and the platens are generally opened for a sufficient period of time during the casting cycle to remove the freshly cast product from the dies and also to apply a lubricant to the forming surfaces. Also, it is desirable in most instances to blow air against the dies at various locations to remove flash which may squeeze out of the runners and cavities along parting lines and also to cool parts of the die which are not effectively cooled by the integral circulating cooling system in the casting machine B.

The application of the lubricant to the die surfaces and also the blowing of the die surfaces are accomplished by means of the reciprocating spraying apparatus A which is supported on the fixed platen 10. The apparatus includes a mounting bracket 16 that defines an elongated channel 17. Guide blocks 18 are secured to the inner faces of the upstanding walls of the channel to define slots 19.

General Arrangement

The apparatus A includes as its principal components a main housing 20, a position-adjusting mechanism 30, a drive assembly 40, and a parallelogram link assembly 50.

The main housing 20 includes a pair of parallel vertical mounting plates 21 and 22 separated from one another by spacers 23 secured by elongated bolts 24. The mounting plates 21 and 22 each have parallel rails 25 bolted at their lower ends and which cooperate with the blocks 18 to permit horizontal adjustment of the apparatus A relative to the stationary die platen 10.

Position Adjusting Mechanism

The position-adjusting mechanism 30 includes a motor 31 with an output shaft 32 that carries a worm 33. The worm 33 engages and drives a worm wheel 34 mounted on a shaft 35. The shaft 35 extends from the rearward end of the apparatus A between the mounting plates 21 and 22 and includes a threaded portion 36 at its inner end. The length of the threaded portion determines the range of adjustment of lateral position of the apparatus A relative to the stationary die platen 10. The threads of the portion 36 engage a stationary nut 37 mounted in fixed position between the mounting plates 21 and 22 (FIG. 5). Accordingly, operation of the motor 31 in forward or reverse directions serves to adjust the position of the apparatus A so that the spray head C may be accurately positioned midway between the two die sections 14 and 15.

Drive Assembly

The drive assembly 40 includes a motor 41 (FIGS. 2, 3, 4, and 7) mounted on the mounting plate 21 and having an output shaft coupled to a gear reduction unit 42. The gear reduction unit 42 is coupled to a shaft 44 that is journaled in the mounting plates 21 and 22 and extends laterally therethrough. The opposite end of the shaft 44 is connected to an encoder 100 located outside of the mounting plate 22.

A pinion 45 is fixed to the shaft 44 between the mounting plates 21 and 22 and is adapted to engage a drive gear 46 fixed to a crankshaft 47 that is journaled in the mounting plates 21 and 22 and extends laterally therethrough. One end of the crankshaft 47 extends outwardly from the mounting plate 22 and carries three switch operating cams 48a, 48b, and 48c that operate respective limit switches used in connection with the control system to be described below.

Link Assembly

The parallelogram link assembly 50 includes a main link 51, a carried arm 55, a control arm 60 and an intermediate link 65. The spray head C is carried at the outer end of the carrier arm 55. The main link 51 has a guide roller 52 mounted at its inner end and adapted for travel in a curved slot 53 formed in a guide plate 54. The guide plate 54 is bolted to the mounting plate 21. The opposite end of the main link 51 extends outwardly from the main housing 20 and is connected to one end of the carrier arm 55 by a pivot pin 56.

The control arm 60 is parallel to the main link 51 and has its lower end bolted to the drive gear 46 by bolts 61 and 62 (FIG. 7) and further secured by pin 63. Also, the crankshaft 47 extends through the control arm 60. The outer end of the control arm 60 is pivotally connected to the carrier link 55 intermediate its ends by a pivot pin 64.

The intermediate link 65 is parallel to the carrier arm 55 and is pivotally connected at one end to the crankshaft 47. The other end of the intermediate link 65 is pivotally connected to the main link 51 intermediate its ends by a pin 66.

Thus, the drive motor 41 through its drive train described above may be moved in forward and reverse directions to cause the carrier arm 55 to move the spray head C from a retracted (or rest) position (FIGS. 1 and 5) to an extended position, with the spray head C located between the die sections 14 and 15 as shown in dotted lines in FIG. 1 and in solid lines in FIG. 6.

As will be apparent from FIGS. 1 and 6, when the parallelogram link assembly 50 is in the extended position, there is considerable weight supported by the mechanism, thus applying a substantial torque to the crankshaft 47. In order to counteract this torque, a counterbalancing means in the form of an air cylinder 70 is connected to the crankshaft 47, as best shown in FIG. 4.

The cylinder 70 is pivotally mounted at its rearward end to a U-shaped bracket 71 secured to the mounting plate 21. The piston 72 of the cylinder 70 is pivotally connected at its outer end to a lever arm 73, which is in turn affixed to the crankshaft 47. The cylinder 70 and lever arm 73 are so arranged that when the crankshaft 47 is pivoted to the position illustrated in FIG. 4, a high retracting force is exerted at the end of the lever 73, thus counterbalancing the weight of the spray head C and parallelogram link assembly 50. On the other hand, when the crankshaft 47 is rotated in the clockwise direction, as viewed in FIG. 4, to bring the parallelogram link assembly 50 to its retracted position shown in dashed lines in FIG. 4, the force exerted by the air cylinder 70 is extremely small.

The spray head C, best shown in FIGS. 5 and 5A, includes a manifold block 80 with a plurality of ports that connect to respective spray nozzles 81 and 82 oriented to spray in opposite directions against both die sections 14 and 15. The nozzles are supplied through the ports by a plurality of hoses 83, 84, 85, 86, 87, and 88 which extend rearwardly back along the carrier arm 55 to the pin 63, whereupon they loop back to the main housing where they are retained by brackets 91 and 92 mounted on the outer face of both of the mounting plates 21 and 22.

Control System

Figure 8:
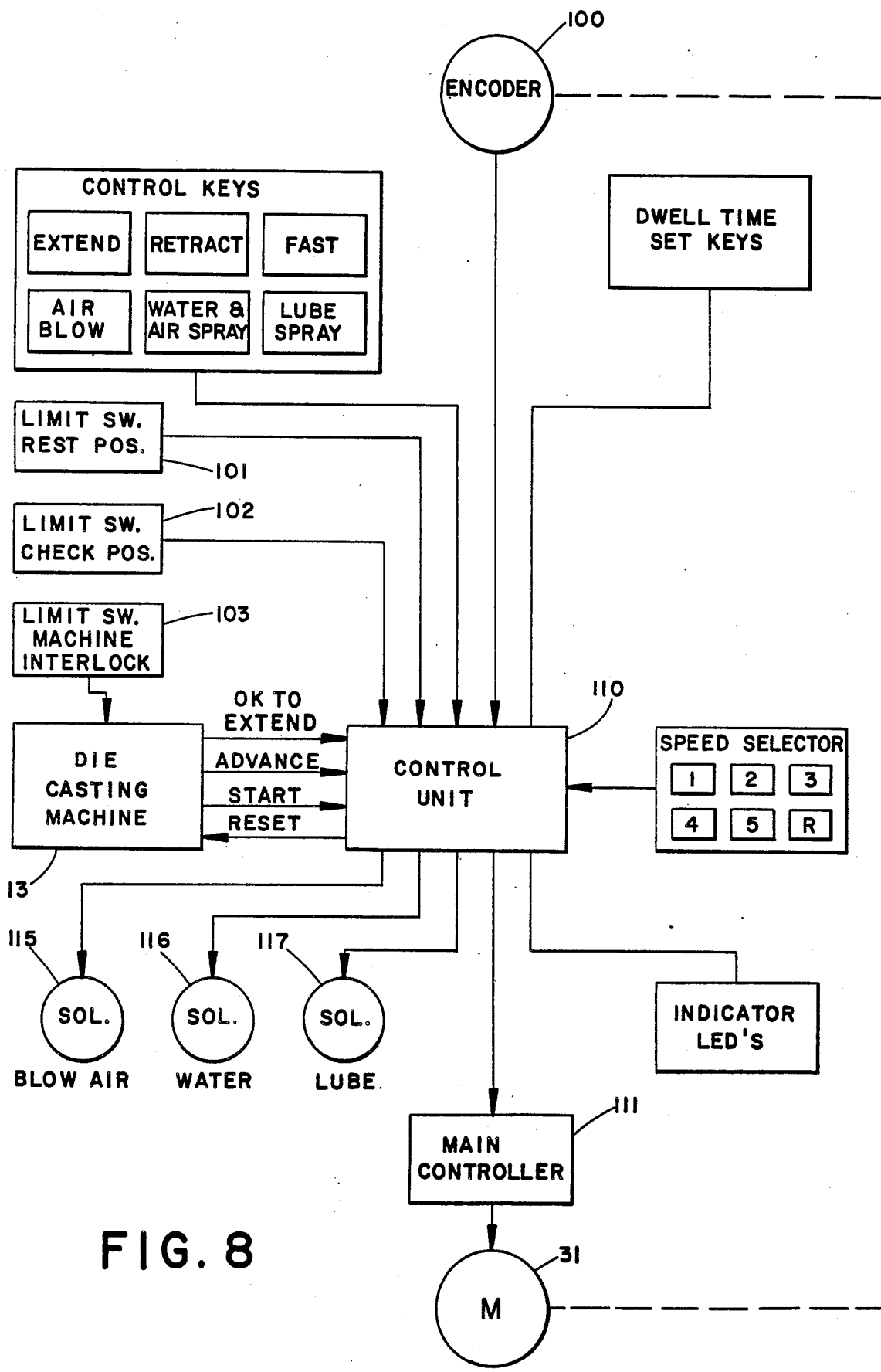
FIG. 8 is a schematic diagram, mostly in block form, of the control system for the apparatus of the invention.

The control system for the reciprocating spraying apparatus A is best shown in FIG. 8, and includes as its principal components a 1600 pulse per revolution encoder 100, limit switches 101, 102, and 103, and a control unit 110. The encoder 100 is connected to and driven by the shaft 44. The limit switch 101 is operated by the cam 48a mounted on the crankshaft 47, and is actuated when the parallelogram linked assembly 50 is in the rest position illustrated in FIGS. 1 and 5. The limit switch 102 is operated by the cam 48b carried by the crankshaft 47 and is actuated when the parallelogram link assembly 50 is moved from its retracted or rest position past a check position wherein the spray head C is positioned vertically above the open die sections 14 and 15. The limit switch 103 is operated by the cam 48c carried by the crankshaft 47 and is used to provide an interlock signal to the die casting machine.

As shown in FIG. 8, the encoder 100 and the limit switches 101, 102, and 103 are connected to the control unit 110, which controls, through a motor controller 111, the drive motor 31, and also operates solenoids 115, 116, and 117, which operate the valves for air, water, and lubricant that are supplied to the spray head C.

The control system includes a number of control keys which are used both to operate the apparatus A and to program the reciprocator for a desired operating cycle. Dwell time set keys are used to set the duration of dwell in various operating positions of the head when it is between the die platens during its operating cycle.

Also, a speed selector panel is provided to select the speeds for various portions of the cycle.

The control unit 110 has various interlocks with the die casting machine 13 to coordinate the operation of the reciprocator A with the machine cycle. The interlocks include an "okay to extend" interlock, a "reciprocator advance" interlock, a "reciprocator start" interlock, and a "reciprocator reset" interlock. The control unit 110 is also capable of initiating operation of the die casting machine D by sending an appropriate signal to start the machine cycle (FIG. 8).

Preferably, the control unit 110 comprises a microprocessor or other unit capable of performing a sequence of operations from a predetermined program. For example, the program may be contained in a "read only" memory which drives a multiplexer unit to provide the necessary signals.

Operation

While the control system for the apparatus A may be used in a manual mode such that all operations are controlled by the operator using the control panel, the operation will be described with respect to a typical automatic operating cycle. The cycle is initiated either by actuating an auto cycle start key or by means of one of the die casting machine interlocks—more particularly, the "okay to extend" interlock.

When the auto cycle start key is used, the arm is moved to the first programmed spray position by the drive motor 41 operating in the forward direction, at a relatively fast predetermined speed.

If the "reciprocator advance" interlock is used, the motor drives the arm to the "advance" or "ready" position at a predetermined slow speed and halts the arm until the auto cycle start key or the reciprocator start interlock is actuated. After the auto cycle start key or the "reciprocator start" interlock is actuated, the motor 42 moves the arm at the predetermined fast speed to the first spray position. The head is then sequenced through as many as five sequential spray positions, depending upon the program selected. At each position, the spray head may be stopped for a predetermined dwell time, one dwell time being selectable for each of the five positions. If time remains for a specific position, any of the predetermined spray functions set for this position are activated for the duration of the dwell time. When the dwell time ends, the move to the next successive spray position is started.

During the movement between successive spray positions the arm moves at a predetermined speed and also any spray functions set during this movement are activated. The spray functions are deactivated when the next successive spray position is reached.

The cycle continues through the remaining spray positions until the dwell time for the last position times out. At this time, the drive motor 41 operates in the reverse direction to retract the spray head and move the parallelogram link assembly 50 through its retraction movement back to the "home" or "rest" position. From this point on, the control system repeats cycles in the proper sequence with the die casting machine B, the cycle being initiated by the die casting machine interlocks.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. Apparatus for moving a fluid emission head through operating cycles that include extension and retraction to and from a space within which predetermined operations are to be performed, comprising:
   a support assembly;
   a crankshaft journaled in said support assembly;
   drive means for turning said crankshaft in forward and reverse directions;
   a main link having an outer end and an inner end connected for guided movement to said support assembly;
   a carrier arm pivotally connected at one end to the outer end of said main link and adapted to carry said fluid emission head at its other end;
   a control arm having an inner end rigidly connected to said crankshaft and an outer end pivotally connected intermediate the ends of said carrier arm, said control arm extending generally parallel to said main link;
   an intermediate link having one end pivotally connected to said crankshaft and its other end pivotally connected intermediate the ends of said main link, said intermediate link extending generally parallel to said carrier arm;
   a guide plate defining a curved slot;
   roller means on said inner end of said main link received in and engaging said slot whereby movement of said inner end conforms to the path defined by said slot to guide said inner end of said main link through a controlled path of travel whereby said fluid emission head is carried through an operating cycle between a retracted position above and laterally offset from the vertical projection of said operating space and an extended position in said work space;
   a lever arm having one end fixed to said crankshaft, resilient means connected between the other end of said lever arm and said support assembly whereby said lever arm applies a variable counterbalancing torque to said crankshaft for counterbalancing the torque applied to said crankshaft resulting from the weight of said parallel link assembly and said fluid emission head when said fluid emission head is moved to and from said extended position.

2. Apparatus as defined in claim 1, wherein said guiding means is calculated to produce a generally vertical path of travel for said fluid emission head.

3. Apparatus as defined in claim 1, wherein said drive means comprises a main pinion keyed to said crankshaft and rotary power transmission means in driving engagement with said main pinion.

4. Apparatus as defined in claim 3, including an encoder connected to said drive means for use in controlling the operation of said rotary motor means and the path of travel of said operating head.

* * * * *